United States Patent
Brown et al.

(10) Patent No.: US 6,604,075 B1
(45) Date of Patent: Aug. 5, 2003

(54) WEB-BASED VOICE DIALOG INTERFACE

(75) Inventors: Michael Kenneth Brown, North Plainfield, NJ (US); Stephen Charles Glinski, Edison, NJ (US); Brian Carl Schmult, Doylestown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/524,964

(22) Filed: Mar. 14, 2000

Related U.S. Application Data

(60) Provisional application No. 60/135,130, filed on May 20, 1999.

(51) Int. Cl.[7] .................................................. G10L 15/00
(52) U.S. Cl. .................................................. 704/270.1
(58) Field of Search .............................. 704/200, 231, 704/270, 270.1, 275; 382/115; 707/5–8, 531

(56) References Cited

U.S. PATENT DOCUMENTS

| | | | |
|---|---|---|---|
| 5,819,220 A | * 10/1998 | Sarukkai et al. | 704/270.1 |
| 5,915,001 A | 6/1999 | Uppaluru | |
| 5,937,422 A | * 8/1999 | Nelson et al. | 707/531 |
| 5,974,413 A | * 10/1999 | Beauregard et al. | 707/6 |
| 5,999,904 A | 12/1999 | Brown et al. | |
| 6,101,473 A | * 8/2000 | Scott et al. | 704/275 |
| 6,144,938 A | * 11/2000 | Surace et al. | 704/270 |
| 6,173,266 B1 | * 1/2001 | Marx et al. | 704/270 |
| 6,173,279 B1 | * 1/2001 | Levin et al. | 707/5 |
| 6,421,453 B1 | * 7/2002 | Kanevsky et al. | 382/115 |

OTHER PUBLICATIONS

D.L. Atkins et al., "Integrated Web and Telephone Service Creation," Bell Labs Technical Journal, pp. 19–35, Winter 1997.

J.C. Ramming, "PML: A Language Interface to Networked Voice Response Units," Workshop on Internet Programming Languages, ICCL '98, Loyola University, Chicago, Illinois, pp. 1–11, May 1998.

(List continued on next page.)

Primary Examiner—David D. Knepper
(74) Attorney, Agent, or Firm—Ryan, Mason & Lewis, LLP

(57) ABSTRACT

A web-based voice dialog interface for use in communicating dialog information between a user at a client machine and one or more servers coupled to the client machine via the Internet or other computer network. The interface in an illustrative embodiment includes a web page interpreter for receiving information relating to one or more web pages. The web page interpreter generates a rendering of at least a portion of the information for presentation to a user in an audibly-perceptible format. A grammar processing device utilizes interpreted web page information received from the web page interpreter to generate syntax information and semantic information. A speech recognizer processes received user speech in accordance with the syntax information, and a natural language interpreter processes the resulting recognized speech in accordance with the semantics information to generate output for delivery to a web server in conjunction with a voice dialog which includes the user speech and the rendering of the web page(s). The output may be processed by a common gateway interface (CGI) formatter prior to delivery to a CGI associated with the web server.

20 Claims, 3 Drawing Sheets

OTHER PUBLICATIONS

M.K. Brown et al., "A Grammar Compiler for Connected Speech Recognition," IEEE Transactions on Signal Processing, vol. 39, No. 1, pp. 17–28, Jan. 1991.

M.K. Brown et al., "A Context–Free Grammar Compiler for Speech Understanding Systems," in ICSLP '94, vol. 1, Yokohama, Japan, pp. 21–24, Sep. 1994.

E. Szurkowski et al., "An Interactive Consumer Video Services Platform Architecture," Telecom '95 Technical Forum, Geneva, Switzerland, 6 pages, Oct. 1995.

J. Chu–Carroll et al., "Initiative in Collaborative Interactions—Its Cues and Effects," 7 pages, In Working Notes of AAAI–97, 1997.

A. Abella et al., "Development Principles for Dialog–Based Interfaces," European Coordinating Committee for Artificial Intelligence (ECCAI) Conference, Budapest University of Economic Sciences, Hungary, pp. 1–7, Aug. 11–16, 1996.

* cited by examiner

WEB-BASED VOICE DIALOG INTERFACE

PRIORITY CLAIM

The present application claims the priority of U.S. Provisional Application No. 60/135,130 filed May 20, 1999 and entitled "Web-Based Voice Dialog Interface."

FIELD OF THE INVENTION

The present invention relates generally to the Internet and other computer networks, and more particularly to techniques for communicating information over such networks via an audio interface.

BACKGROUND OF THE INVENTION

The continued growth of the Internet has made it a primary source of information on a wide variety of topics. Access to the Internet and other types of computer networks is typically accomplished via a computer equipped with a browser program. The browser program provides a graphical user interface which allows a user to request information from servers accessible over the network, and to view and otherwise process the information so obtained. Techniques for extending Internet access to users equipped with a telephone or other type of audio interface device have been developed, and are described in, for example, D. L. Atkins et al., "Integrated Web and Telephone A Language Interface to Networked Voice Response Units," Workshop on Internet Programming Languages, ICCL '98, Loyola University, Chicago, Ill., May 1998, both of which are incorporated by reference herein.

Current approaches to web-based voice dialog generally fall into two categories. The first category includes those approaches that use HyperText Markup Language (HTML) and extensions such as Cascading Style Sheets (CSS) to redefine the meaning of HTML tags.

The second of the two categories noted above includes those approaches that utilize a new language specialized for voice interfaces, such as Voice eXtensible Markup Language (VoiceXML) from the VoiceXML Forum (which includes Lucent, AT&T and Motorola), Speech Markup Language (SpeechML) from IBM, or Talk Markup Language (TalkML) from Hewlett-Packard. These languages may be viewed as presentation mechanisms that address primarily the syntactic issues of the voice interface. The semantics of voice applications on the web are generally handled using custom solutions involving either client-side programming such as Java and Javascript or server-side methods such as Server-Side Include (SSI) and Common Gateway Interface (CGI) programming. In order to create a rich dialog interface to a computer application using these language-based approaches, an application developer generally must write explicit specifications of the sentences to be understood by the system, such that the actual spoken input can be transformed into the equivalent of a mouse-click or keyboard entry to a web form.

Examples of web-based voice dialog systems are described in U.S. patent application Ser. No. 09/168,405, filed Oct. 6, 1998 in the name of inventors M. K. Brown et al. and entitled "Web-Based Platform for Interactive Voice Response," which is incorporated by reference herein. More specifically, this application discloses an Interactive Voice Response (IVR) platform which includes a speech synthesizer, a grammar generator and a speech recognizer. The speech synthesizer generates speech which characterizes the structure and content of a web page retrieved over the network. The speech is delivered to a user via a telephone or other type of audio interface device. The grammar generator utilizes textual information parsed from the retrieved web page to produce a grammar. The grammar is then supplied to the speech recognizer and used to interpret voice commands generated by the user. The grammar may also be utilized by the speech synthesizer to create phonetic information, such that similar phonemes are used in both the speech recognizer and the speech synthesizer.

The speech synthesizer, grammar generator and speech recognizer, as well as other elements of the IVR platform, may be used to implement a dialog system in which a dialog is conducted with the user in order to control the output of the web page information to the user. A given retrieved web page may include, for example, text to be read to the user by the speech synthesizer, a program script for executing operations on a host processor, and a hyperlink for each of a set of designated spoken responses which may be received from the user. The web page may also include one or more hyperlinks that are to be utilized when the speech recognizer rejects a given spoken user input as unrecognizable.

Despite the advantages provided by the existing approaches described above, a need remains for further improvements in web-based voice dialog interfaces. More specifically, a need exists for a technique which can provide many of the advantages of both categories of approaches, while avoiding the application development difficulties often associated with the specialized language based approaches.

SUMMARY OF THE INVENTION

The present invention provides an improved voice dialog interface for use in web-based applications implemented over the Internet or other computer network.

In accordance with the invention, a web-based voice dialog interface is configured to communicate information between a user at a client machine and one or more servers coupled to the client machine via the Internet or other computer network. The interface in an illustrative embodiment includes a web page interpreter for receiving information relating to one or more web pages. The web page interpreter generates a rendering of at least a portion of the information for presentation to a user in an audibly-perceptible format. The web page interpreter may make use of certain pre-specified voice-related tags, e.g., HTML extensions. A grammar processing device utilizes interpreted web page information received from the web page interpreter to generate syntax information and semantic information. A speech recognizer processes received user speech in accordance with the syntax information, and a natural language interpreter processes the resulting recognized speech in accordance with the semantics information to generate output for delivery to a web server in conjunction with a voice dialog which includes the user speech and the rendering of the web page(s). The output may be processed by a common gateway interface (CGI) formatter prior to delivery to a CGI associated with the web server.

The grammar processing device may include a grammar compiler, and may implement a grammar generation process to generate a grammar specification language which is supplied as input to a grammar compiler. The grammar generation process may utilize a thesaurus to expand the grammar specification language.

In accordance with another aspect of the invention, the web page interpreter may further generate a client library associated with interpretations of web pages previously performed on a common client machine. The client library will generally include a script language definition of semantic actions, and may be utilized by a web server in generating an appropriate response to a user speech portion of a dialog.

In accordance with a further aspect of the invention, dialog control may be handled by representing a given dialog turn in a single web page. In this case, a finite-state dialog controller may be implemented as a sequence of web pages each representing a dialog turn.

In accordance with yet another aspect of the invention, the processing operations of the web-based voice dialog interface are associated with an application developed using a dialog application development tool. The dialog application development tool may include an authoring tool which (i) utilizes a grammar specification language to generate output in a web page format for delivery to one or more clients, and (ii) parses code to generate a CGI output for delivery to the web server.

Advantageously, the techniques of the invention allow a voice dialog processing system to reduce client-server traffic and perform immediate execution of client-side operations. Other advantages include less computational burden on the web server, the elimination of any need for specialized natural language knowledge at the web server, a simplified interface, and unified control at both the client and the server.

DETAILED DESCRIPTION OF THE INVENTION

Figure 1:
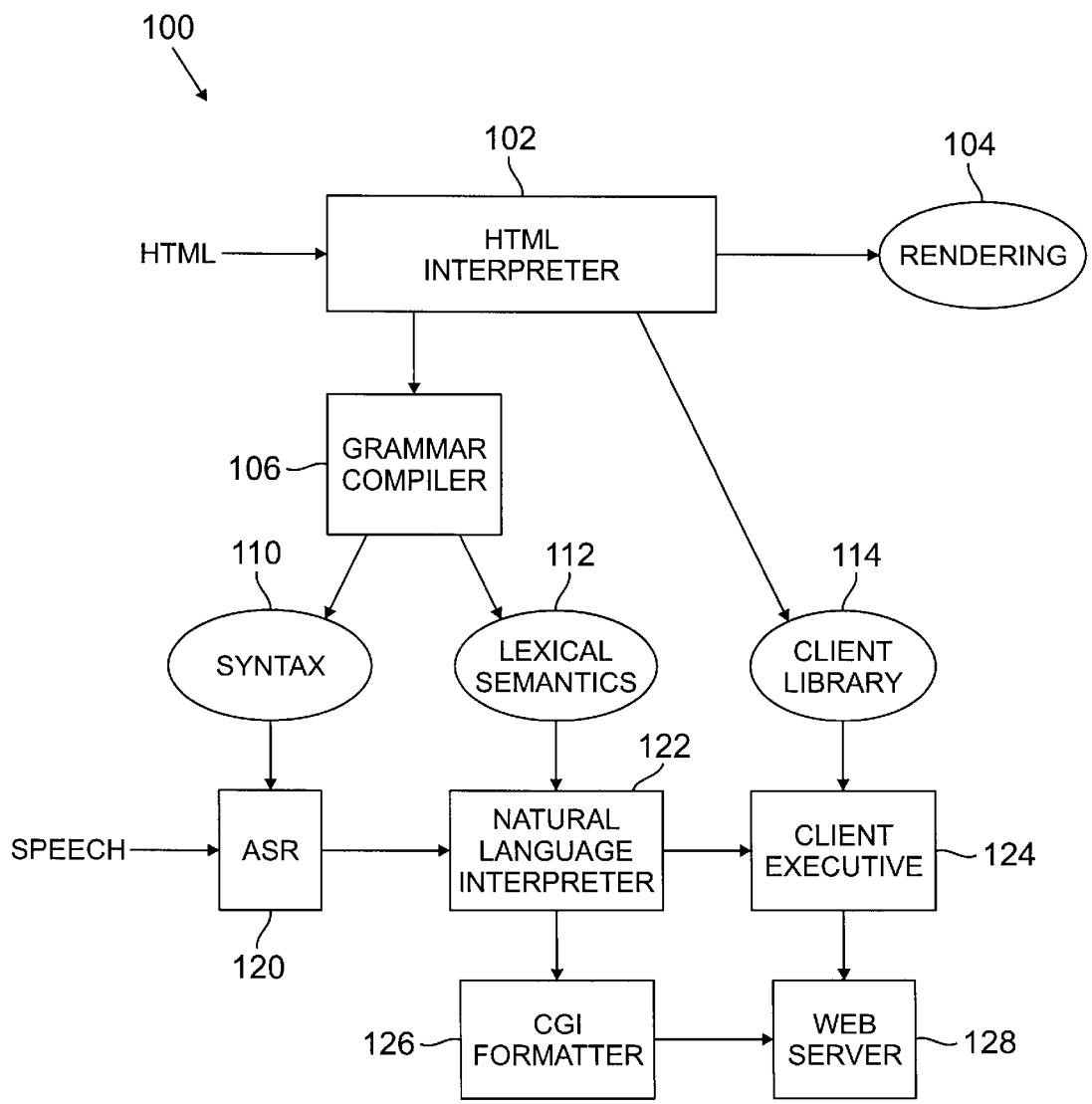
FIG. 1 is a block diagram of an illustrative web-based processing system which includes a voice dialog interface in accordance with the invention.

The present invention will be illustrated below in conjunction with an exemplary web-based processing system. It should be understood, however, that the invention is not limited to use with any particular type of system, network, network communication protocol or configuration. The term "web page" as used herein is intended to include a single web page, a set of web pages, a web site, and any other type or arrangement of information accessible over the World Wide Web, over other portions of the Internet, or over other types of communication networks. The term "processing system" as used herein is intended to include any type of computer-based system or other type of system which includes hardware and/or software elements configured to provide one or more of the voice dialog functions described herein.

The present invention in an illustrative embodiment automates the application development process in a web-based voice dialog interface. The interface in the context of the illustrative embodiment will be described herein using a number of extensions to conventional HyperText Markup Language (HTML). It should be noted that, although the illustrative embodiment utilizes HTML, the invention can be implemented in conjunction with other languages, e.g., Phone Markup Language (PML), Voice eXtensible Markup Language (VoiceXML), Speech Markup Language (SpeechML), Talk Markup Language (TalkML), etc.

HTML Extensions

The above-noted HTML extensions may be embedded in the scope of an HTML anchor as follows:

<A>HREF="URL" special_tags>title</A> where URL represents the Uniform Resource Locator and title is the string of mouse-sensitive words of the hyperlink. The special_tags are generally ignored by conventional visual web browsers that are not designed to recognize them, but have special meaning to voice browsers, such as the PhoneBrowser built on the Lucent Speech Processing System (LSPS) platform developed by Lucent Technologies Inc. of Murray Hill, N.J. Examples of the special tags include the following:

| | |
|---|---|
| SILENT | Inhibits Text-to-Speech (TTS) processing of the title of this link, making it silent. |
| VOICE="parameters" | Set parameters for voice synthesis. |
| IGNORETITLE | Inhibits Automatic Speech Recognition (ASR) processing of the title of this link; usually used with Grammar Specification Language (GSL). |
| NOPERMUTE | Inhibits combinatoric processing of the title of this link for ASR; forces the user to speak the entire title. |
| LSPSGSL="string" | Defines a GSL grammar to be used by ASR for this link. This must use the LSPS syntax, and is platform-dependent. |
| LSPSGSLHREF="URL" | Defines a GSL grammar, as above, obtained from a URL. |
| DISOVERRIDE | Causes the link title to take precedence over normal anchor titles during disambiguation, including built-in PhoneBrowser commands. If several items specify DISOVERRIDE then disambiguation will take place among them. |
| PRIORITY=# | Set the command priority level, higher #'s take precedence. |
| URLINSERT | Causes the ASR or DTMF response string triggering this anchor to be inserted in the URL in place of a "%s". Typically used in a QUERY_INFO string. |
| BARGEIN={ "ON" \| "OFF" } | Turn barge-in on or off (default is on). |
| INITIALTIMEOUT= seconds | Specify how many seconds can elapse from the time the recognizer is started to the time the user starts speaking. If no speech starts by this time, the URL (required) is taken. |
| GAPTIMEOUT=seconds | Specify how many seconds can elapse from the time the user stops speaking to the time that recognition takes place. If nothing is recognized during this time, it is presumed that the utterance was not recognized, and the URL (required) is taken. A default value of two seconds is normally supplied, and this should be specified only in special circumstances. |
| MAXTIMEOUT=seconds | Specify how many seconds can elapse from the time the recognizer is started to the time that recognition takes place. If no speech starts by this time, or nothing has been recognized, the URL (required) is taken. |

Three of the above-listed tags form the basis for defining a language interface that is richer than simple hyperlink titles. For the LSPS platform, which will be used in the illustrative embodiment, these are LSPSGSL, LSPSGSLHREF, and URLINSERT. The first two allow the specification of a rich speech recognition (SR) grammar and vocabulary. In a more general purpose implementation, these might be replaced with other tags, such as GRAMMAR and GRAMHREF, respectively, as described in the above-cited U.S. patent application Ser. No. 09/168,405.

The third tag, URLINSERT, allows arbitrary SR output to be communicated to a web server through a Common Gateway Interface (CGI) program. As will be described in greater detail below, these extensions provide the basis for a more powerful set of web-based speech application tools.

The above-listed IGNORETITLE and NOPERMUTE tags will now be described in greater detail. The current implementation of PhoneBrowser normally processes hyperlink titles to automatically generate navigation command grammars. The processing involves computing all possible combinations of meaningful words of a title (i.e., simple function words like "the," "and," etc. are not used in isolation), thereby allowing word deletions so that the user may speak some, and not all, of the words in a title phrase. This simple language model expansion mechanism gives the user some flexibility to speak a variety of commands to obtain the same results. The IGNORETITLE tag causes the system to inhibit all processing of the hyperlink title. This is usually only useful when combined with one of the grammar definition tags, but may also be used for certain timeout effects. The NOPERMUTE tag inhibits processing of the title word combinatorics, making only the full explicit title phrase available in the speech grammar.

It should be understood that the above-described tags are shown by way of illustrative example only, and should not be construed as limiting the invention in any way. Other embodiments of the invention may utilize other types of tags.

Unified Syntactic/Semantic Specifications

Conventional methods for creating web-based speech applications generally involve design of speech grammars for SR and the design of a natural language command interpreter to process the SR output. Grammars are usually defined in finite-state form but are sometimes expressed as context-free gram mars(CFGs). Natural language interpreters generally include a natural language parser and an execution module to perform the actions specified in the natural language input. This combination provides the basic mechanism for processing a discourse of spoken utterances. Discourse, in this case, is defined as a one-sided sequence of expressions e.g., one agent speaking one or more sentences.

Many existing SR products use a grammar definition language called Grammar Specification Language (GSL). GSL in its original versions was generally limited to syntactic definition. Later versions of GSL incorporate semantic definitions into the syntactic specification. The resulting grammar compiler automatically creates the command interpreter as well as the finite-state or CFG representation of the language syntax.

In accordance with the present invention, the process of developing web-based speech applications can be automated by using an extension of these principles for HTML-based speech applications.

Original semantic GSL expressions take the following example form, from a robot control grammar described in M. K. Brown, B. M. Buntschuh and J. G. Wilpon, "SAM: A Perceptive Spoken Language Understanding Robot," IEEE Trans. SMC, Vol. 22, No. 6, pp. 1390–1402, September 1992, which is incorporated by reference herein:

{(move[Move]|rotate[Rotate])the{1(red|green)(cup|block)}}.

In this example, each statement is a sentence. Each word could become a phrase in a more general example. Parentheses enclose exclusive OR forms, where each word or phrase is separated by vertical bars, and these expressions can be nested. Square brackets contain the name of a C function that will be called when the adjoining word (or phrase) is spoken in this sentence. Curly brackets enclose argument strings that will be sent to the C function. When the user says "rotate the green cup" the outcome is the C function call:

Rotate("green cup");

Another way to implement semantic actions is to use a dispatch function as follows:

{[Exec]{0 (move|rotate)} the {1 (red|green)(cup|block) }}.

In this case, the dispatch function Exec is called with argument 0 set to "rotate," thereby signaling Exec to call the Rotate function.

This specification form is very general. C functions can be defined anywhere within a sentence statement and arguments can be arbitrarily scoped and nested (even reusing the same text repeatedly). Functions defined within the scope of an argument in the scope of another function will return a computed argument value to the enclosing function at execution time. Hence, a complete function call tree is created.

The simple example given above only specifies six sentence possibilities. More typical definitions would specify complex syntax and semantics having many thousands of sentence possibilities (the full robot grammar for this example specified $6 \times 10^{20}$ sentences in about 1.5 pages of GSL code).

The actual GSL implementation is also more complicated than illustrated here. The compiler performs macro expansion, takes cyclic and recursive expressions, performs recursion transformations, performs four stages of optimization, and generates syntactic and semantic parsers. The semantic function interface follows the Unix protocol using the well-known Unix func (argc, argv) format. The semantic parser can be separated from the syntactic parser and used as a natural language keyboard interface.

Lexicon Driven Semantics

It is known that semantic specification expressions can be written by attaching C functions to verbs while collecting adjectives and nouns into arguments. In accordance with the invention, this process can be simplified further for the application developer by providing a natural language lexicon containing word classifications. This lexicon can either reside in the client (e.g., in a browser) or in a web server.

Using the above-noted URLINSERT mechanism that inserts an SR output string directly into a URL, a server-side lexicon would generally be needed. Each HTML page may use a different lexicon and it is desirable to share lexicons across many servers, so a lexicon may reside on a server different from the semantics-processing server. With a minor extension of the URLINSERT mechanism the lexicon information could be sent to the server using the POST mechanism of the HyperText Transfer Protocol (HTTP). However, this approach puts an increased burden on the server. A server-side solution using a variety of such lexicons is also inconsistent with the stateless nature of existing web server technology.

Lexicon driven semantics generally require a higher level representation of language structure. Phrase structure grammar variables are used to define the sentence structure, which can be broken down into more detailed descriptions, eventually leading to word categories. Word categories are typically parts of speech such as noun, adjective and verb designators. Parsing of a sentence is performed bottom up until a complete phrase structure is recognized. The semantics are then extracted from the resultant parse tree. Verb phrases are mapped into semantic actions while noun phrases are mapped into function arguments.

Client-Side Semantics

Converting syntax to semantics at the client has a number of advantages, including: less computational burden on the web server; distribution of computation to clients; no need for specialized knowledge of natural language at the server; a simplified interface; unified control at both the client and server; and fast response to local commands.

FIG. 1 shows a processing system 100 which implements a web-based voice dialog interface in accordance with the illustrative embodiment of the invention. The portions of the system 100 other than web server 128 are assumed for this example to be implemented on the client-side, e.g., in a browser associated with a client computer or other type of client processing device. A client in accordance with the invention may any type of computer, computer system, processing device or other type of device, e.g., a telephone, a television set-top box, a computer equipped with telephony features, etc., capable of receiving and/or transmitting audio information.

The client-side portions of the system 100 are assumed to be coupled to the web server 128 via a conventional network connection, e.g., a connection established over a network in a conventional manner using the Transmission Control Protocol/Internet Protocol (TCP/IP) standard or other suitable communication protocol(s).

The system 100 receives HTML information from the Internet or other computer network in an HTML interpreter 102 which processes the HTML information to generate a rendering 104, i.e., an audibly-perceptible output of the corresponding HTML information for delivery to a user. The rendering 104 may include both visual and audio output. The HTML information is also delivered to a grammar compiler 106 which processes the information to generate a syntax 110 and a set of lexical semantics 112. The grammar compiler 106 may be of the type described in M. K. Brown and J. G. Wilpon, "A Grammar Compiler for Connected Speech Recognition," IEEE Trans. ASSP, Vol. 39, No. 1, pp. 17–28, January 1991, which is incorporated by reference herein. The HTML interpreter 102 also generates a client library 114.

It should be noted that the grammar compiler 106 may incorporate or otherwise utilize a grammar generation process, such as that described in greater detail in the above-cited U.S. patent application Ser. No. 09/168,405, filed Oct. 6, 1998 in the name of inventors M. K. Brown et al. and entitled "Web-Based Platform for Interactive Voice Response." For example, such a grammar generation process can receive as input parsed HTML, and generate GSL therefrom. The grammar compiler 106 may be configured to take this GSL as input and create an optimized finite-state network for a speech recognizer. More particularly, the GSL may be used, e.g., to program the grammar compiler 106 with an expanded set of phrases so as to allow a user to speak partial phrases taken from a hyperlink title. In addition, a stored thesaurus can be used to replace words with synonyms so as to further expand the allowed language.

The grammar compiler 106 is an example of a "grammar processing device" suitable for use with the present invention. Such a device in other embodiments may incorporate a grammar generator, or may be configured to receive input from a grammar generator.

In the system 100 of FIG. 1, speech received from a user is processed in an automatic speech recognizer (ASR) 120 utilizing, the syntax 110 generated by the grammar compiler 106. The output of the ASR is applied to a natural language interpreter 122 which utilizes the lexical semantics 112 generated by the grammar compiler 106. The output of the natural language interpreter 122 is supplied to client executive 124 and CGI formatter 126, both of which communicate with a web server 128. The client executive 124 processes the interpreted speech from the interpreter 122 in accordance with information in the client library 114. The client executive 124 can be one of a variety of interpreters, such as Java, Javascript or VisualBasic interpreters. The CGI formatter 126 can also be written in one of these languages and executed from the client executive 124, but may be more efficiently implemented as part of a client browser.

Although shown as separate elements in the system 100, the ASR 120 and natural language interpreter 122 may be different elements of a single speech recognition device. Moreover, although illustrating as including a single web server, the system 100 can of course be utilized in conjunction with multiple servers in numerous different arrangements.

The incoming HTML information in the system 100 of FIG. 1 is thus processed for multiple simultaneous purposes, i.e., to generate the rendering 104, to extract a natural language model containing both syntactic and semantic information in the form of respective syntax 110 and lexical semantics 112, and to generate a script language definition of semantic actions via the client library 114.

Advantageously, extracting semantics on the client side in the manner illustrated in FIG. 1 allows the system 100 to reduce client-server traffic and perform immediate execution of client-side operations.

The CGI format as implemented in the CGI formatter 126 will now be described in greater detail. A general URL format suitable for use in calling a CGI in the illustrative embodiment includes five components: protocol, host, path, PATH_INFO, and QUERY_STRING, in the following syntax:

{protocol}://{host}/{path}/{PATH_INFO}?{QUERY_STRING} where protocol can generally be one of a number of known protocols, such as, e.g., http, ftp, wais, etc., but for use with a CGI the protocol is generally http; host is usually a fully qualified domain name but may be relative to the local domain; path is a slash-separated list of directories ending with a recognized file; PATH_INFO is additional slash-separated information that may contain a root directory for CGI processing; and QUERY_STRING is an ampersand-separated list of name-value pairs for use by a CGI program. The last two items become available to the CGI program as environment values in the environment of the CGI at the web server 128. Processing of the URL by the client and web server is as follows:

1. client connects to host (or sends complete URL to proxy and proxy connects to host) web server;
2. client Issues GET or POST request using the remainder of the URL after the host;
3. server parses path searching from the public filesystem root until it recognizes a path element;
4. server continues parsing path until either end of string or '?' token is seen, setting PATH_INFO; and
5. server sets QUERY_STRING with remaining URL string. The URL may not contain white-space characters but QUERY_STRING blanks can be represented with "+" characters.

Continuing with the previous robot grammar example, for server-side execution the speech grammar specification can be written into a hyperlink:

<A HREF="http://hdst/pathinfo?%s" URLINSERT
GSL="{(move[Move]rotate[Rotate])
the{1(red|green)(cup|block)}.">
Title</A>

In this example, the underlying platform has been extracted from the grammar specification tag. The presence of semantics in the GSL string indicates that the QUERY_INFO string should contain a preprocessed semantic expression rather than the unprocessed SR output string. In this case, URLINSERT will result in analysis of the SR output text yielding the URL:

http://host/pathinfo?EXEC="(Rotate+1='green+cup'}"

A concise format is used. The curly brackets delimit scope. Argument numbers indicate argument positions, and do not need to be in order or consecutive (i.e., some or all arguments can be undefined). Nested functions can be handled by nesting the call format as the following example illustrates:

. . . ?EXEC="{func1+1='{func2+1='arg1'+2='arg2'}}"

The function name does not need to appear first within the execution scope, although it may be easier to read this style.

Execution on the client side would normally be limited by security measures, since the content from the web server may originate from an unreliable source. For purposes of simplicity and clarity of illustration, however, such security concerns will not be considered in the present description. These concerns can be addressed using convention security techniques that are well-understood in the art.

On the client side, the Rotate operation is performed by calling the Rotate function defined in the client library 114 of FIG. 1. The Rotate function can be defined in Java, for example, and called upon receiving the appropriate speech command.

Web-Based Dialog

The term "dialog" generally refers to a multi-sided sequence of expressions. Handling dialog in a voice dialog interface generally requires an ability to sequence through what is commonly called a dialog turn. A dialog turn may be defined as two or more "plys" in a dialog tree or other type of dialog graph necessary to complete an exchange of information. A dialog graph refers generally to a finite-state representation of a complete set of dialog exchanges between two or more agents, and generally contains states and edges as does any mathematical graph. The dialog graph may be virtual in the sense that the underlying implementation is rule-based, since rule-based systems maintain "state" but may not be finite in scope. A "ply" is a discourse by one agent. When discussing dialogs of more than two agents, the conventional terminology "dialog turn" may be inadequate, and other definitions may be used.

It should be noted that web-based dialogs may model a given computer or other processing device as a single agent that may be multi-faceted, even though the actual system may, include multiple servers. The primary, multi-faceted agent may then serve as a portal to the underlying agents.

In accordance with the invention, control of dialog for the single agent can be handled by representing a single two-ply dialog turn in a single HTML page. A sequence of such pages forms a finite-state dialog controller.

Figure 2:
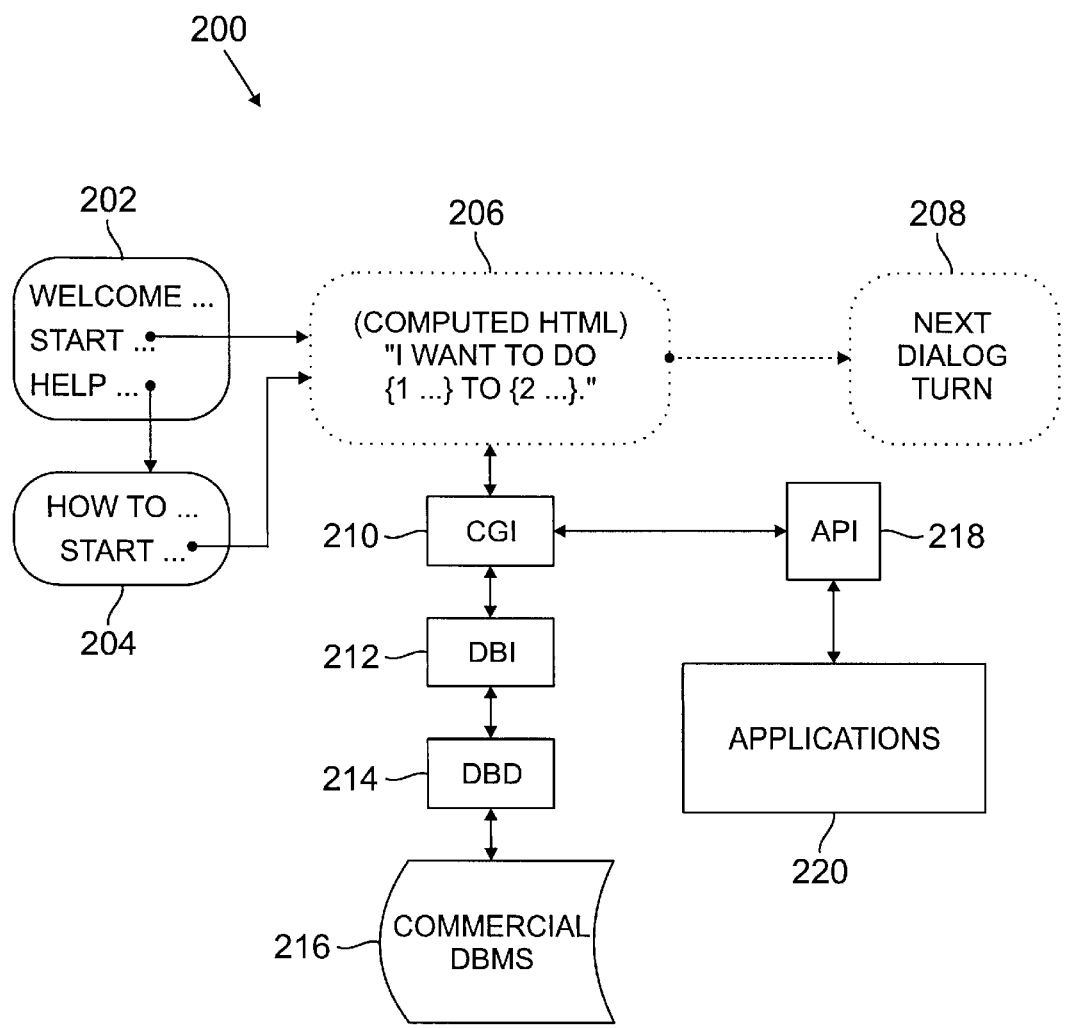
FIG. 2 illustrates a finite-state dialog process involving a set of web pages and implemented using the web-based processing system of FIG. 1.

FIG. 2 illustrates a finite state dialog controller 200 of this type. The dialog controller 200 uses the HTML extensions described previously. Controlled speech synthesis output of a given web page is presented to a user, and the current context of command grammar is defined and utilized, in a manner similar to that previously described in conjunction with FIG. 1.

The finite state dialog controller 200 of FIG. 2 operates on a set of web pages which include in this example web pages 202, 204, 206 and 208. Web page 202 is an HTML page which represents a "Welcome" page, and includes "Start" and "Help" hyperlinks. The "Help" hyperlink leads to web page 204, which includes a "How to" section and a "Start" hyperlink. The "Start" hyperlinks on pages 202 and 204 both lead to page 206, which includes computed HTML corresponding to an output of the form "I want to do {1 . . . } to {2 . . . }." The web page 208 represents the next dialog turn.

In the controller 200, the HTML for a given dialog turn is constructed using a CGI 210 which may be configured to include application-specific knowledge. As shown in FIG. 2, the CGI 210 interacts with a database interface (DBI) 212 and a database driver (DBD) 214. The DBI 212 is coupled via the DBD 214 to a commercial database management system (DBMS) 216. Suitable DBIs and DBDs are freely available on the Internet for most of the popular commercial DBMS products. The CGI 210 further interacts with an application program interface (API) 218 to an underlying set of one or more application(s) 220.

When a user speaks a client-side command, such as "speak faster" or "speak louder," the command is executed immediately and the presentation continues. When a navigation command associated with a hyperlink is spoken, control is transferred to the corresponding new web page, dialog turn, and presentation and speech grammar context. The process can then continue on to a new dialog state. In this way, using many relatively small web pages, a complete client-server dialog system can be created.

Condition Handling

Conditions are system states that prompt the interface system or the application to take the initiative. Such a mechanism was used in the SAM system described in the above-cited M. K. Brown et al. reference. Additional details regarding conditions in the context of dialog can be found in, e.g., J. Chu-Carroll and M. K. Brown, "An evidential model for tracking initiative in collaborative dialogue interactions," User Modeling and User-Adapted Interaction Journal, Special Issue on Computational Models for Mixed Initiative Interaction, 1998; J. Chu-Carroll and M. K. Brown, "Initiative in collaborative interactions—Its cues and effects," In Working Notes of the AAAI-97 Spring Symposium on Computational Models for Mixed Initiative Interaction, pages 16–22, 1997; and J. Chu-Carroll and M. K. Brown, "Tracking initiative in collaborative dialogue interactions," In Proceedings of the 35th Annual Meeting of the Association for Computational Linguistics (ACL-97), pages 262–270, 1997, all of which are incorporated by reference herein.

Dialog system conditions may be used to trigger a dialog manager to take charge for a particular period, with the dialog manager subsequently relinquishing control as the system returns to normal operation.

Examples of condition types include the following: error conditions, task constraints, missing information, new language, ambiguity, user confusion, more assistance available, hazard warning, command confirmation, and hidden event explanation.

These conditions can be created by the user, the system or both, and are listed above in approximate order of severity. The first five conditions are severe enough to prevent processing of a command until the condition is addressed. User confusion is a more general condition that may prevent further progress or may simply slow progress. The remaining conditions will not prevent progress but will prompt the system to issue declarative statements to the user.

Error conditions generally fall into three classes: application errors, interface errors, and user errors. Application errors occur when the application is given information or commands that are invalid in the current application state. For example, database information may be inconsistent with new data, etc. This kind of error needs to be handled by an application having knowledge of the associated processing, but may also require additional HTML content to provide user feedback. For example, the user may be taken to a help system.

Interface errors in this context are speech recognition errors that in many cases are easy for the user to correct by simply issuing a designated command such as a "go back" command. In some cases, processing may not easily be reversed, so an additional confirmation step is advisable when speech recognition errors could be costly. Keeping the grammar context limited, whenever possible, decreases the likelihood of recognition errors but can also create a variety of other problems when the user is prone to making a mistake about how the application functions.

A user command may be syntactically and semantically correct but not possible because the application is unable to comply. Handling task constraints requires a tighter coupling between the application and the interface. In most cases, the application will need to signal the interface of inability to process and command and perhaps suggest ways that the desired goal can be achieved. This signal may be at a low application level having no knowledge of natural language. The interface then must expand this low level signal into a complete natural language expression, perhaps initiating a side dialog to deal with the problem.

Often the user will provide only some of the information necessary to complete a task. For example, the user might tell a travel information agent that they "want to go to Boston." While the system might already know that the user is in, e.g., New York City, it is still necessary to know the travel date(s), time of day, and possible ground transportation desired. In this case, offering more assistance may be desirable, or simply asking for the needed information may suffice.

Occasionally the user will speak a new word or words that the system has not heard before. This causes the interface to divert to a dialog about the new word(s). The user can be asked to tell the system the type of word (adjective, noun, verb, etc.) and possibly associate the new word with other words the system already knows about. Acquiring the acoustic patterns of new words is also possible using phonetic transcription grammars, with speech recognition, but is technically more difficult.

It should be noted that commands can be ambiguous. The system can handle this by listing a number of possible explicit interpretations using, e.g., different words to express the same meaning or a more elaborate full description of the possible interpretations. The user can then choose an interpretation or rephrase the command and try again.

User confusion may be detected by measuring user performance parameters such as long response times, frequent use of incomplete or ambiguous commands, lack of progress to a goal, etc. As such, user confusion is not detected quickly by the system but is a condition that results from an averaging of user performance. As such a user confusion index slowly increases, the system should offer increasing levels of assistance, increasing the verbosity of conversation. An expert user will thus be able to quickly achieve goals with low confusion scores.

Hazard warnings and command confirmation work together to protect the user and system from performing dangerous, possibly irreversible actions. Examples include changing database entries that remove previous data, purchasing non-refundable airline tickets, etc. In many cases, these actions may not be visible or obvious to the user, or it may be desirable to explain to the user not only what the system is doing on behalf of the user, but also how the system is doing it.

It is usually important not to prevent the user from making mistakes by simply ignoring invalid requests, because the user will find it difficult to learn about such mistakes. Leaving all invalid commands out of the grammar for a given context may therefore result in user confusion. Instead, a well designed error handling system will recognize the erroneous command and send the user to a source of context-sensitive help for information on the proper use of commands in the current system state. User errors involving misunderstanding of the application may require cooperation between an application help system and an interface help system, since the user may not only be using the application incorrectly at a given point but have thereby arrived at an incorrect state in the dialog. The help facility then needs to know how to quickly get the user to the correct state and instruct the user on how to proceed.

There are several ways the system can help the user either automatically or explicitly. Explicit requests for help can be handled either by a built-in help system that can offer general help about how to use the voice interface commands, or by navigating to a help site populated with HTML pages containing a help system dialog and/or CGI programs to implement a more sophisticated help interface. CGIs have the additional advantage that the calling page can send its URL in the QUERY_STRING, thereby enabling the help dialog system to return automatically to the same place in the application dialog after the help system has completed its work. The QUERY_STRING information can also be used by the help system to offer context-sensitive help accessed from a global help system database. The user can also return to the application either by using a "go back" command or using a "go home" command to start over.

Using the above-described INITIALTIMEOUT, GAPTIMEOUT, and MAXTIMEOUT special_tags and a standard HTML<META HTTP-EQUIV="Refresh"...>tag, the system can take the initiative when the user fails to respond or fails to speak a recognizable command within specified time periods. Each type of timeout can take the user to a specific part of a help system that explains why the system took charge and what the user can do next.

Dialog Application Development Tools

The present invention also provides dialog application development tools, which help an application developer quickly build new web-based dialog applications. These tools may be implemented at least in part as extensions of conventional HTML authoring tools, such as Netscape Composer or Microsoft Word.

A dialog application development tool in accordance with the invention may, e.g., use the word classification lexicon described earlier so as to allow default function assignments to be made automatically while a grammar is being specified. The application developer can then override these defaults with explicit choices. Simultaneously, the tool can automatically write code for parsing the QUERY_INFO strings containing the encoded semantic expressions. This parsing code may then be combined with a semantic transformation processor provided to the developer as part of a web-based dialog system development kit (SDK).

Additional details regarding elements suitable for use in such an SDK are described in, e.g., M. K. Brown and B. M. Buntschuh, "A Context-Free Grammar Compiler for Speech Understanding Systems," ICSLP'94, Vol. 1, pp. 21–24, Yokohama, Japan, September 1994, which is incorporated by reference herein.

Figure 3:
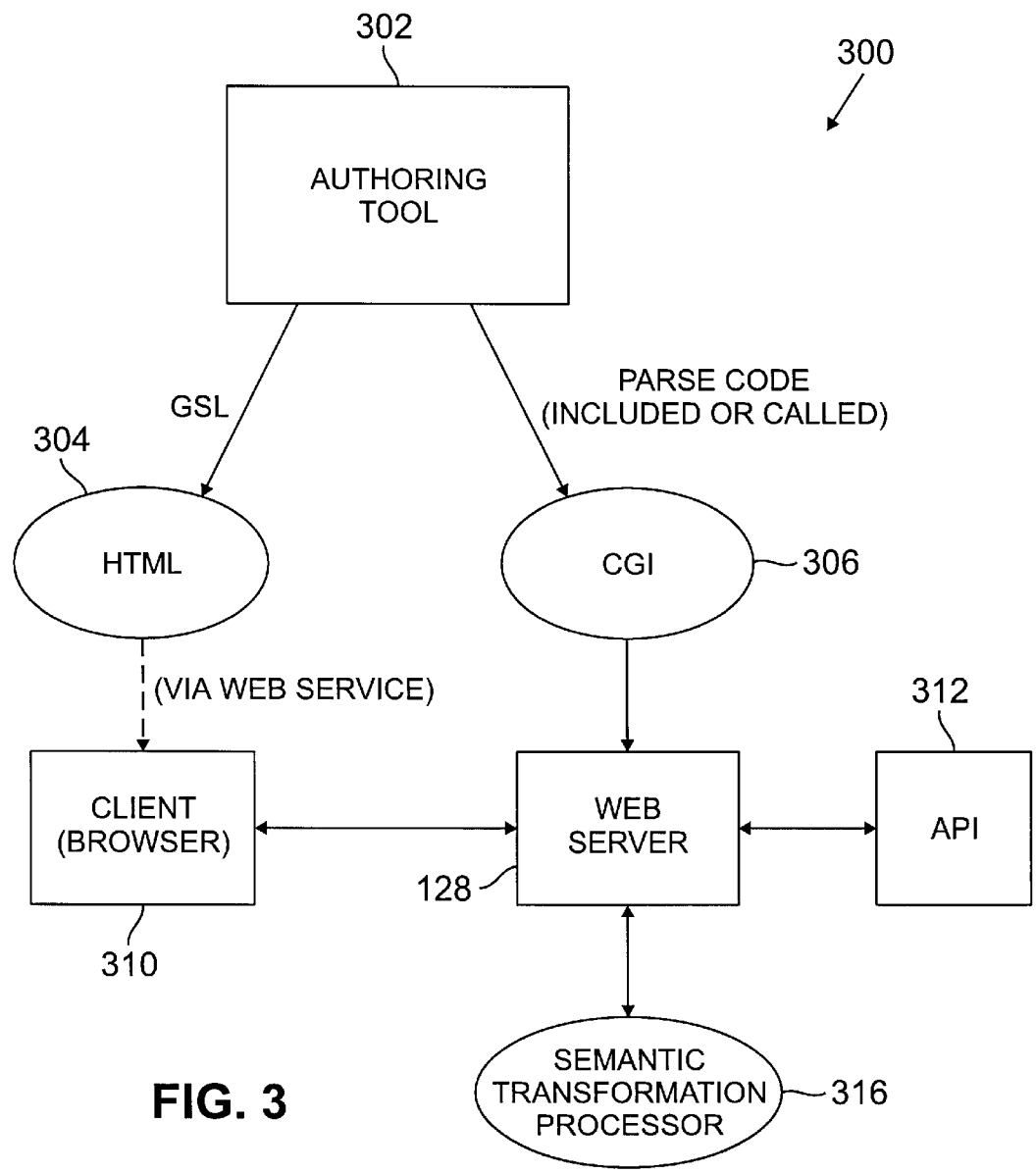
FIG. 3 illustrates the operation of a web-based dialog application development tool in accordance with the invention.

FIG. 3 illustrates the operation of a dialog application development tool 300 in accordance with the invention. The application development tool 300 includes an authoring tool 302 which utilizes GSL to generate an HTML output 304, and parses included or called code to generate CGI output 306. The HTML output 304 is delivered via Internet or other web service to a client 310, e.g., to a browser program running on a client computer. The CGI output 306 is delivered to a web server 128 which also has associated therewith an API 312 and a semantic transformation processor 316. The web server 128 communicates with the client 310 over a suitable network connection.

At execution time, the semantic transformation processor 316 runs on the web server 128, e.g., as a module of the web server CGI program, and it transforms the parsed semantic expressions from the authoring tool 302 into calls to application functions that perform semantic actions through the API 312. The API 312 may be written using any of a variety of well-known languages. Language interface definitions to be included in the CGI code can be provided as part of the dialog application development tool for the most popular languages, e.g., C, C++, Java, Javascript, VisualBasic, Perl, etc.

Automatic Language Model Expansion

One possible difficulty remaining for the application developer is definition of all the ways a user might state each possible command to the speech interface. Simple language model expansion, as described previously, relaxes the constraints on the user slightly, allowing the user to speak a variety of phrases containing key words from the original title. Further language model expansion can be obtained, e.g., by using a thesaurus to substitute other words having similar meaning for words that appeared in the original title. In addition, a hyperlink title can be parsed into its phrase structure representation, and then transformed into another phrase structure of the same type, e.g., interrogotory, assertion or imperative, from which more phrase expressions can be derived.

The application developer can then write simple hyperlink title statements representing the basic meaning assigned to that link, using either a natural language expression (e.g., English sentences as used in the above example) or a higher level description using phrase structure grammar tags. When using natural language, the system generally must first convert the natural language into phrase structure form to perform structure transformations. When using phrase structure format, the application developer generally must use an intermediate level of expression that specifies word classes or categories, so that the system will know how to expand the phrase structure tokens into natural language words.

This capability can be built into an dialog application development tool, providing the application developer with a wide variety of choices in developing new speech controlled web content. In combination with existing web development tool technology, this additional capability makes the development of speech-activated web sites with rich dialog control easy to implement for application developers who are not experts in speech processing.

It should be noted that various evolving web-based voice browser language proposals are now being considered by the World Wide Web Consortium (W3C) Voice Browser Working Group. These emerging standards may influence the particular implementation details associated with a given embodiment of the invention.

The above-described embodiments of the invention are intended to be illustrative only. Numerous alternative embodiments within the scope of the following claims will be apparent to those skilled in the art.

What is claimed is:

1. An apparatus for implementing a web-based voice dialog interface, the apparatus comprising:

a first interpreter for receiving information relating to one or more web pages, the first interpreter generating a rendering of at least a portion of the information for presentation to a user in an audibly-perceptible format;

a grammar processing device having an input coupled to an output of the first interpreter, the grammar processing device utilizing interpreted web page information received from the first interpreter to generate syntax information and semantic information;

a speech recognizer which processes user speech in accordance with the syntax information generated by the grammar processing device; and a second interpreter having an input coupled to an output of the speech recognizer, the second interpreter processing recognized speech in accordance with the semantics information from the grammar processing device to generate output for delivery to a web server in conjunction with a dialog which includes at least a portion of the rendering and the user speech.

2. The apparatus of claim 1 wherein the grammar processing device comprises a grammar compiler.

3. The apparatus of claim 2 wherein the grammar processing device implements a grammar generation process to generate a grammar specification language which is supplied as input to the grammar compiler.

4. The apparatus of claim 3 wherein the grammar generation process utilizes a thesaurus to expand the grammar specification language.

5. The apparatus of claim 1 wherein the first interpreter comprises a web page interpreter capable of interpreting web pages formatted at least in part using HTML.

6. The apparatus of claim 1 wherein the second interpreter comprises a natural language interpreter.

7. The apparatus of claim 1 wherein the output generated by the second interpreter is further processed by a common gateway interface formatter prior to delivery to the web server.

8. The apparatus of claim 1 wherein the common gateway interface formatter formats the output generated by the second interpreter into a format suitable for a common gateway interface associated with the web server.

9. The apparatus of claim 8 wherein the common gateway interface is coupled to a database management system.

10. The apparatus of claim 1 wherein the first interpreter further generates a client library associated with interpretations of web pages previously performed on a common client machine, the client library including a script language definition of semantic actions.

11. The apparatus of claim 10 further including a client executive program which processes information in the client library for delivery to the web server.

12. The apparatus of claim 1 wherein the web page information is at least partially in an HTML format.

13. The apparatus of claim 12 wherein the first interpreter includes a capability for interpreting a plurality of voice-related HTML tags.

14. The apparatus of claim 1 wherein dialog control is handled by representing a given dialog turn in a single web page.

15. The apparatus of claim 14 wherein a finite state dialog controller is implemented as a sequence of web pages each representing a dialog turn.

16. The apparatus of claim 1 wherein the processing operations of the dialog are associated with an application developed using a dialog application development tool.

17. The apparatus of claim 16 wherein the dialog application development tool comprises an authoring tool which utilizes a grammar specification language to generate output in a web page format for delivery to one or more clients, and parses code to generate a common gateway interface output for delivery to the web server.

18. A method for implementing a web-based voice dialog interface, the method comprising the steps of:
    generating a rendering of at least a portion of a set of information relating to one or more web pages received over a network, for presentation to a user in an audibly-perceptible format;
    utilizing interpreted web page, information to generate syntax information and semantic information;
    processing user speech in accordance with the syntax information; and
    processing recognized speech in accordance with the semantics information to generate output for delivery to a web server in conjunction with a dialog which includes at least a portion of the rendering and the user speech.

19. A machine-readable medium for storing one or more programs for implementing a web-based dialog interface, wherein the one or more programs when executed by a processing system carry out the steps of:
    generating a rendering of at least a portion of a set of information relating to one or more web pages received over a network, for presentation to a user in an audibly-perceptible format;
    utilizing interpreted web page information to generate syntax information and semantic information;
    processing user speech in accordance with the syntax information to generate recognized speech; and
    processing the recognized speech in accordance with the semantics information to generate output for delivery to a web server in conjunction with a dialog which includes at least a portion of the rendering and the user speech.

20. A processing system comprising:
    at least one computer for implementing at least a portion of an web-based voice dialog interface, the interface including: (i) a first interpreter for receiving information relating to one or more web pages, the first interpreter generating a rendering of at least a portion of the information for presentation to a user in an audibly-perceptible format; (ii) a grammar processing device having an input coupled to an output of the first interpreter, the grammar processing device utilizing interpreted web page information received from the first interpreter to generate syntax information and semantic information; (iii) a speech recognizer which processes user speech in accordance with the syntax information generated by the grammar processing device; and (iv) a second interpreter having an input coupled to an output of the speech recognizer, the second interpreter processing recognized speech in accordance with the semantics information from the grammar processing device to generate output for delivery to a web server in conjunction with a dialog which includes at least a portion of the rendering and the user speech.

* * * * *

UNITED STATES PATENT AND TRADEMARK OFFICE
CERTIFICATE OF CORRECTION

PATENT NO. : 6,604,075 B1  Page 1 of 1
DATED : August 5, 2003
INVENTOR(S) : M.K. Brown et al.

It is certified that error appears in the above-identified patent and that said Letters Patent is hereby corrected as shown below:

Column 14,
Line 60, replace "of claim 1" with -- of claim 7 --.

Signed and Sealed this

Twenty-first Day of October, 2003

JAMES E. ROGAN
*Director of the United States Patent and Trademark Office*